United States Patent [19]

Baucom et al.

[11] Patent Number: 5,057,338
[45] Date of Patent: Oct. 15, 1991

[54] PROCESS FOR APPLICATION OF POWDER PARTICLES TO FILAMENTARY MATERIALS

[75] Inventors: Robert M. Baucom, Newport News; John J. Snoha; Joseph M. Marchello, both of Hampton, all of Va.

[73] Assignee: The United States of America as represented by the Administrator of the National Aeronautics and Space Administration, Washington, D.C.

[21] Appl. No.: 524,109

[22] Filed: May 16, 1990

[51] Int. Cl.⁵ .............................................. B05D 1/24
[52] U.S. Cl. .................................... 427/185; 427/195; 427/375; 118/DIG. 5; 156/166; 156/283
[58] Field of Search .................. 427/189, 195, 375; 118/DIG. 5; 156/166, 283; 264/136, 133, 134

[56] References Cited
U.S. PATENT DOCUMENTS 3,742,106  6/1973  Price .................................. 264/134
3,862,287  1/1975  Davis ................................. 264/134
4,243,699  1/1981  Gibson ............................... 427/183
4,614,678  9/1986  Ganga ............................... 264/136
4,799,985  1/1989  McMahon et al. .................. 156/166

Primary Examiner—Shrive Beck
Assistant Examiner—Benjamin L. Utech
Attorney, Agent, or Firm—George F. Helfrich

[57] ABSTRACT

This invention is a process for the uniform application of polymer powder particles to a filamentary material in a continuous manner to form a uniform composite prepreg material. A tow of the filamentary material is fed under carefully controlled tension into a spreading unit, where it is spread pneumatically into an even band. The spread filamentary tow is then coated with polymer particles from a fluidized bed, after which the coated filamentary tow is fused before take-up on a package for subsequent utilization. This process produces a composite prepreg uniformly without imposing severe stress on the filamentary material, and without requiring long, high temperature residence times for the polymer.

2 Claims, 1 Drawing Sheet

PROCESS FOR APPLICATION OF POWDER PARTICLES TO FILAMENTARY MATERIALS

ORIGIN OF THE INVENTION

The invention described herein was jointly made in the performance of work under a NASA Contract and an employee of the United States Government. In accordance with 35 U.S.C. 202, the contractor elected not to retain title.

BACKGROUND OF THE INVENTION

1. Field of the Invention

The present invention relates generally to the application of powder particles to filamentary materials. It relates in particular to the uniform application of polymer powder particles to spread continuous fiber tows in a fluidized bed unit.

2. Description of Related Art

Thermoplastic composites offer the potential of more attractive mechanical properties at elevated temperatures than do other materials. The primary concern in achieving this potential has been the difficulty experienced in combining thermoplastics with continuous fiber tows to produce a composite prepreg material.

Many previous attempts to apply polymer matrices to filamentary materials have been attempted including: slurry coating, coating from solvent base matrices, film coating and calendaring. The general disadvantage of most prior art methods for producing composite prepreg materials is the non-uniform distribution of the polymer materials throughout the filamentary materials and the difficulty in removal of some species of carrier materials in the polymer matrix in subsequent processing steps. In particular, the high viscosity of polymer melts and the limited solubility of polymer in volatile solvents have ruled out conventional hot melt and solution prepregging methods. This in turn has led to efforts to develop other combining methods such as emulsion, slurry and dry powder. See, e.g., Babu Varughese and John Muzzy, "Combining LARC-TPI and Powder with Carbon Fiber by Electrostatic Fluidized Bed Coating," 21st International SAMPE Technical Conference, Atlantic City, September 1989. The dry powder prepreg processes presently under development contact the tow with powder and either encase, bind, or sinter the powder to the fibers. See especially, J. L. Throne, R. M. Baucom, and J. M. Marchello, "Recent Developments in Dry Powder Prepregging on Carbon Fiber Tow," FiberTex Conference, Clemson University, October 1989; and K. Friedreich, T. Gogera and S. Fakirove, *Composite Science and Technology*, Vol. 33, pp. 97-120, 1988. Because of the tendency for movement of powder encased with the tow in an extruded tube, and for binder failure with powder loss during weaving, sintering appears to be the preferred method for attaching the powder. The dry processes spread the tow and contact it with powder suspended in air or nitrogen. Investigators at Georgia Institute of Technology and the University of Akron utilize electrostatic force to collect the particles on the tow.

It is accordingly the primary object of the present invention to provide a method for the uniform application of polymer powder particles to filamentary materials in a continuous manner to form a uniform composite prepreg material.

SUMMARY OF THE INVENTION

This primary object, as well as its attending advantages and benefits, are attained by the provision of a process having the following sequential steps:

(1) Feeding filamentary material: In order to provide precise filament tow tension control, externally pressurized air bearing rolls are utilized to provide frictionless filament feed spool rotation. A bulk carbon faced brake is utilized to provide accurate tow tension on the feed spool during processing.

(2) Spreading the filamentary material: Spreading of the filamentary material is effected by introducing a tow bundle into a slot tunnel which is composed of upper and lower plates separated by divergent bars which have holes perpendicular to the fiber tow feed direction. Vacuum pressure is applied to a plenum chamber which surrounds the slot tunnel. This vacuum, in turn, is drawn through the aforementioned holes in the bars on either side of the slot tunnel. The flow of the air lateral to the filament feed direction has the effect of uniformly spreading the fiber tow into an even band. The spread of the tow into a band is controlled by the level of vacuum in the slot tunnel and the tow tension applied at the feed roll station.

(3) Coating the spread filamentary material: The spread fiber tow is then directed into a powder circulation chamber which operates by establishing a recirculating cloud of air borne powder particles. Provisions are made to add additional powder material as it is plated out on the fiber tow.

(4) Fusing the coated filamentary material: Heat is applied to the coated filamentary material to fuse the polymer powder onto the fibers. A standard laboratory horizontal tube furnace is conveniently employed.

(5) Taking up the fused coated filamentary material: The fused coated fiber tow is collected on a take-up spool, e.g., a standard traveling/rotating take-up spool mechanism.

BRIEF DESCRIPTION OF THE DRAWING

For a more complete understanding of the present invention, including its primary object and attending advantages and benefits, reference should be made to the Description of the Preferred Embodiments, which is set forth in detail below. This detailed description should be read together with the accompanying drawing, wherein the sole FIGURE is a schematic representing the combination of procedural steps which is the present invention.

DESCRIPTION OF THE PREFERRED EMBODIMENTS

Figure 1:
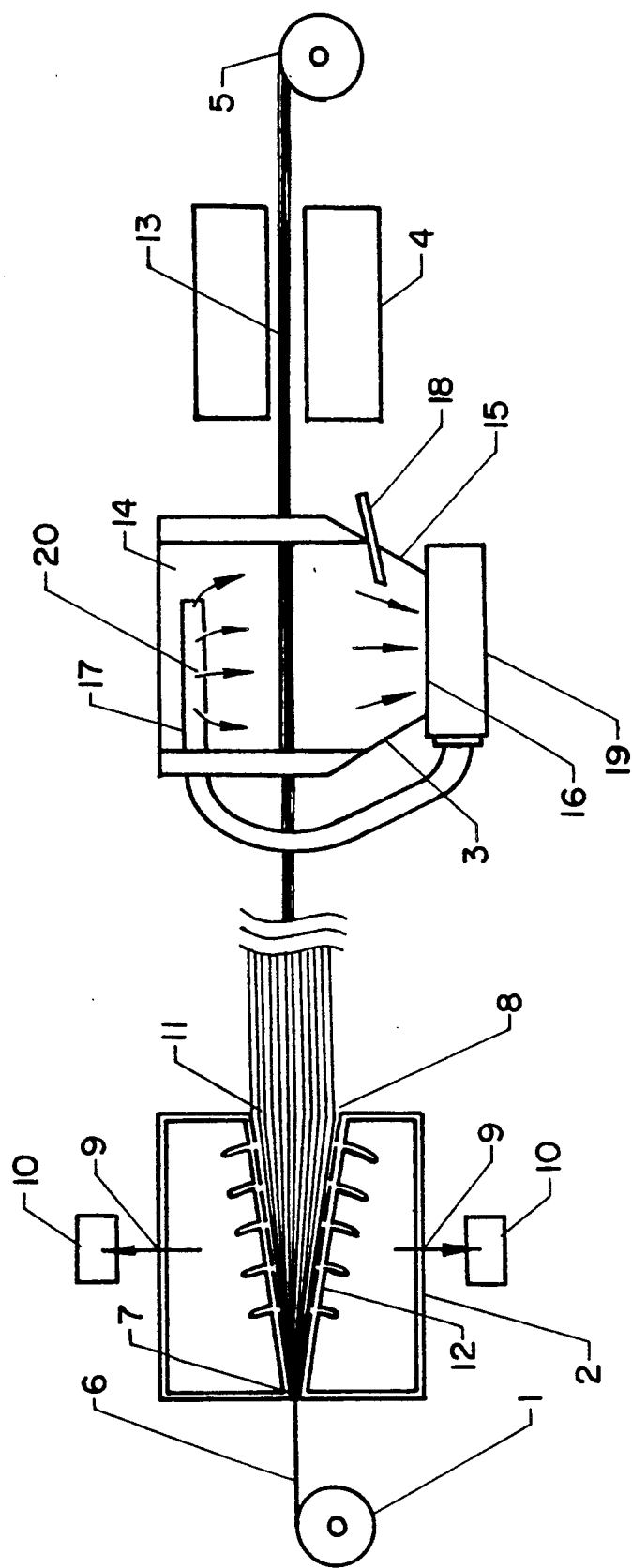

In the specific examples which follow, the following materials and equipment were utilized:

A. Starting Materials. Unsized Hercules AS-4 carbon fibers in three and 12K tows were used with LARC-TPI2000 polyimide powder obtained from Mitsui Toatsu Chemicals, Inc., 200 Park Avenue, New York, N.Y. 10166. The powder had an average particle size of 19 microns ($7.4 \times 10^{-4}$ in.).

B. Prepreg System. Referring to the drawing, the experimental set-up was comprised in sequence of: a tow feed spool with tow tension brake 1; a pneumatic tow spreader 2; a fluidized bed coating unit 3; a horizontal tube furnace 4; and a take-up spool 5.

Particularly, tube furnace 4 was an electric oven with a 5.0 cm (2.0 in.) diameter and 37.5 cm (15.0 in.) long tubular core 13, which was used to heat the powder laden tow from the fluidized bed coating unit 3. The tow take-up position 5 beyond the oven, was spatially fixed using a synchronized transversing drive and constant speed motor for the take-up spool.

C. Tow Tension. Because tow tension is important to the performance of the pneumatic tow spreader 2, a feed spool brake system was used to set and maintain tow tension during prepreg runs. A spring loaded graphite pad brake was mounted to the end of the feed roller. Pressure on the brake surface was achieved by tightening a wing nut on the screw that passes through a spring coil to the pad.

The tow tension brake was calibrated for different wing nut settings by determining the amount of weight hung on the tow that first caused the spool to rotate. The unbraked spool was mounted on air bearings and turned freely with less than a four grams resistance. Brake friction consists of two parts, the inertia required to set the spool in motion and the sliding friction once it is moving. Since the unbraked turning inertia was small, it was assumed the tow tension that would be in effect during the operation of the prepreg unit was the sliding brake value. The brake was calibrated in increments up to 75 grams (2.6 oz.) of tow tension at three complete wing nut turns. Repeated tests indicated that tow tension could be set and maintained within ten percent.

D. Pneumatic Tow Spreader. The tow bundle 6 enters the spreader 2 at the throat 7 of a flat expansion section 12. Air enters at the tow exit slot 8 and is drawn through holes 9 in the sidewalls of the expansion section into a vacuum manifold 10. This cross-flow of air provides lateral force on the fibers resulting in a tow spread 11 across the flat channel.

The tow expansion section 12 was 0.25 in high and 43.8 cm (17.5 in.) long and the exit slot 8 was 0.22 cm (0.090 in.), 1.6 cm high and 5.08 cm (2 in.) wide for the 12K tow. With 3K tow the section height was reduced to 0.31 cm (0.125 in.) and the exit slot height to 0.1 cm (0.040 in.). The tow spread angle from the entrance throat to the outer edge of the exit slot was six degrees. To minimize problems with loose fibers being drawn into the sidewall holes, the sidewall angle from the throat was eight degrees. Nine holes were located along each sidewall with diameters of 0.20, 0.23, 0.27, 0.31, 0.35, 0.39, 0.43 and 0.47 cm (0.080, 0.094, 0.109, 0.125, 0.141, 0.156, 0.172 and 0.187 in.).

Control of the pressure drop for flow through these holes, together with tow tension adjustments determined the tow spread for angles up to six degrees or a 5.08 cm (2 in.) width of 12K tow. With 3K tow the spread width was 1.87 cm (0.75 in.). A series of calibration runs were made to correlate the range of tow brake settings 0 to 75 grams (0 to 2.6 oz.) and vacuum levels 0.72 Pa (0 to 0.50 psi) with tow spread angle for tow rates up to 5 cm/sec (2.0 in./sec.) for this unit.

E. Particle Feeder. The fluidized bed coating unit 3 had to be supplied with resin powder at a rate on the order of one gram (0.04 oz.) per minute, depending on the tow speed, prepreg level and powder losses. A bubbling bed feeder 18 was used to supply resin to the system.

The feeder 18 consisted of a vertical plexiglass tube 45 cm (18 in.) high with an inside diameter of 4.4 cm (1.75 in.). At the start of a prepreg run powder was added to bring the settled bed to about 20 cm (8 in.) below the exit tube at the top of the cylinder. During operation when the settled bed level had decreased to 30 cm (12 in.) from the top resin was added. Nitrogen was fed into two opposing bottom openings so that it caused vigorous bubbling in the resin bed with flow out the top opening of a uniform feed stream of resin suspended in nitrogen. Samples of the feed stream particle size distribution at intervals of operation showed no significant change. The vertical column bubbling bed column is, intentionally, a poor elutriation type particle separator.

A cartridge filter was used to calibrate the feed system. The calibration procedure involved vacuum cleaning and weighing a cartridge filter, placing it in the feeder exit line running the feeder for five minutes at a set nitrogen rate, and reweighing the cartridge to determine the weight of the powder collected. In this way data were obtained for the grams of resin per minute conveyed by the nitrogen flow measured in cubic feet per hour.

At a given nitrogen rate, R, the resin feed conveyed from the bubbling bed, F, changes with the amount of resin in the cylinder. That is, the resin flow decreases with time, $\tau$, of feeder operation as shown by the feeder calibration relationship: $F=(0.204 R-1.29)/(1+0.085\tau)$. This expression covers nitrogen flow rates between 0.28 and 1.10 m$^3$/hr. (10 and 40 ft$^3$/hr.) for feeder operating times up to 45 minutes. To maintain a constant resin mass flow the nitrogen rate must be increased during the interval between refilling. For example, with F=2 gm/min (0.07 oz./min): $R=16.1+0.85\tau$, the initial nitrogen rate is 0.46 m$^3$/hr (16.1 ft$^3$/hr.) and after 20 minutes it should be 0.93 m$^3$/hr (33 ft$^3$/hr) to sustain the desired 2-gm/min (0.07 oz./min) of resin flow.

F. Fluidized Bed Coating Unit. The fiber tow from the pneumatic tow spreader 2 enters the fluidized bed coating unit 3 through a narrow slot on one side, passes horizontally through three slotted baffles, enters the central chamber 14, then passes through three slotted baffles and a wall slot as it leaves the unit.

The central chamber 14 is 15 cm (6 in.) long in the tow travel direction and 20 cm (8 in.) across. The rectangular portion is 10 cm (4 in.) high. The four sided pyramid bottom 15 extends 11.25 cm (4.5 in.) down to inlet 16 of fan 19. The walls of the pyramid are 18.75 cm (7.5 in.) long. The volume of the fluidization section, exclusive of fan and return lines, is 5600 cc (359 in$^3$).

At the start of a prepreg run an initial amount of powder is placed in the chamber 14. Fresh resin and nitrogen from the feeder enters on one side. A fan 19 at the bottom of chamber 14 removes powder and nitrogen and blows it into external tubing 17 which conveys the mixture up to where it re-enters at the top 20 of the chamber 14. This flow recirculation, about 0.03 m$^3$/min (1.0 ft$^3$/min), together with a vibrator against the chamber wall, serves to keep the resin powder suspended.

The unit has three settling sections at the tow entrance and exit sides. Baffles that form these sections extend from the top to within 1.0 cm (0.4 in.) of the bottom. In these sections, powder settles out onto the sloped bottom 15 and slides to the fan intake 16. The nitrogen that conveyed feed to the unit is withdrawn at the top of the two outer settling chambers. The vacuum level used to remove the nitrogen is adjusted to keep powder from escaping through the tow slots.

The recirculation fan 19 is driven by a motor beneath it. Powder has the tendency to leak into the fan shaft bearings resulting in fan operating problems. This was overcome by mounting the two shaft bearings in the ends of a cylinder and applying nitrogen pressure to the cylinder. The small nitrogen flow out through the bearings served to keep resin from entering and greatly reduced maintenance requirements.

THEORETICAL CONSIDERATIONS

1. Tow Spreader. In the pneumatic spreader tow fibers are subject to the tow tension, $F_t$, and the air drag, $F_w$, toward the wall. Under these forces a fiber would move at an angle, $\phi$, given by $$\tan \phi = F_w/F_t \tag{1}$$

Tow tension is set by the brake on the feed spool. Air drag on the fiber results from flow in the spreader chamber.

The air drag on a fiber can be determined from data correlations for flow passed through a cylinder. The pressure difference between the air in the spreader and the surrounding vacuum manifold is primarily due to the flow resistance of the small holes in the spreader section walls. For subsonic flow through these holes the air velocity, $U_o$, may be obtained from the orifice equation:

$$U_o = C_o(2g_c\Delta P/\rho)^{\frac{1}{2}} \tag{2}$$

Where $C_o$ is the orifice coefficient, $g_c$ the gravitational constant, $\rho$ the air density and $\Delta P$ the pressure drop. The coefficient is constant, $C_o = 0.61$, in the flow range of interest.

In the spreader chamber, the air flow toward the walls, $U_w$, is related to flow through the holes by the area ratio $$U_w = U_o(A_o/A_w) \tag{3}$$

The air drag for flow passed a cylinder is (7)

$$F_w = (C_D\rho U_w^2 D_f L/g_c \tag{4}$$

Where $C_D$ is the drag coefficient, $D_f$ the diameter and L the length of the fiber. Substituting equations (2) and (3) into (4) gives $$F_w = (C_D D_F L C_o^2 A_o^2/A_w^2)\Delta P \tag{5}$$

with the exception of $C_D$ all the terms in the bracket are constant. In the lower flow ranges the drag coefficient is a function of Reynolds number of $U_w$ and may be expressed in terms of $\Delta P$ through equations (2) and (3). therefore, $$F_w = f(\Delta P) \tag{6}$$

and from equation (1) the fiber angle, $\phi$, would be $$\phi = \tan^{-1}[f(\Delta P)F_t] \tag{7}$$

For a given tension, $F_t$, the angle can be set by the pressure difference drawn on the chamber. Conversely, for a given $\Delta P$, the angle may be adjusted by changing the tow brake setting for the tension.

The above analysis has dealt with the air drag on a single isolated fiber. The tow is comprised of thousands of fibers and air flow passed through a fiber is influenced by the surrounding fibers. While the exact flow conditions are unknown, the general form of equation (7) also would apply for a multi-fiber system. This suggests that the tow spread angle may be correlated as a function of tension and pressure drop.

2. Fluidized Bed. The expanded fiber tow behaves like a fibrous filter. Particle collection is by momentum impaction, inception owing to van der Waals forces, Brownian diffusion and in some cases electrostatic force. Theoretical analysis (8) indicate that the collection efficiency of a single fiber, $\eta_o$, is a function of the parameter, $\Psi$, $$\Psi = D_p^2 U \rho_p/18\mu D_f \tag{8}$$

Where $D_p$ is the particle diameter, U, the gas velocity, $\rho_p$, the particle density, $\mu$, the gas viscosity and $D_f$, the fiber diameter.

The collection efficiency of a fiber when other fibers are nearby is given by the relationship (9):

$$\eta_i = \eta_o[1 + 10R_e^{\frac{1}{2}}(1-\epsilon_f)] \tag{9}$$

Where $R_e$ is the Reynolds number for flow passed through the fiber and $\epsilon_f$, is the void fraction of the fiber mat.

The fiber-particle collision cross-section is $[D_p + D_f]L$. For a particle cloud density, n, and gas velocity, U, the rate at which particles arrive at the fiber surface is $nU[D_p + D_f]L$. With an average collection efficiency, $\eta_i$, the rate of deposition on the N fibers in the tow is $$dM/dt = n\eta_i U[D_p + D_f]LN \tag{10}$$

and $$dM/dt = PW_t U_t \tag{11}$$

Where P is the weight percent prepreg, $W_t$, the tow weight per unit length and $U_t$, the linear tow rate. Combining equation (10) and (11)

$$P = \{\eta_i U[D_p + D_f]L\ N/W_t\}nU_t \tag{12}$$

For a given type of flow bundle, chamber dimensions and recirculation level, and resin powder the term {} is constant. This is the transport operating equation for fluidized bed units. For a given system the prepreg level is directly proportional to the resin cloud density, n, and inversely proportional to the tow rate, $U_t$.

EXAMPLES

1. Prepreg Operation. The fluidized bed powder prepreg system of the present invention was operated over a range of conditions to confirm design theory and operating correlations and to provide the basis for scale up.

A series of test runs were made at tow speeds from 0.87 to 4.2 cm/sec (0.34 to 1.65 in./sec) and oven temperatures from 260° to 300° C. (500° to 572° F.). Runs were started with initial amounts of resin charge in the chamber ranging from 50 to 150 grams (1.8 to 5.3 oz.). Samples were cut at regular intervals from the tow leaving the electric oven and weighed to determine the resin level in the prepreg. From these test runs the operating conditions were established for longer steady rate operation of the system.

A typical LARC-TPI run to produce a 30.5 m (100 ft.) continuous sample would start with 75 grams (2.6 oz.) of resin in the chamber, an oven temperature of 280° C. (536° F.) a tow rate of 4.2 cm/sec (1.7 in./sec)

with tow tension of 65 grams (2.3 oz.) and spreader pressure drop of $0.17 \times 10^{-4}$ Pa (0.25 psi). The nitrogen resin feed gas rate would be set at 0.85 m$^3$/hr (30 ft.$^3$hr). After a few minutes a tow sample would be cut and weighed. It would have about 40 wt % resin. The nitrogen flow to the bubbling bed feeder would be increased after five minutes to 1.0 m$^3$/sec (35 ft.$^3$/hr) and at ten minutes to 1.13 m$^3$/hr (40 ft.$^3$/hr). After 13 minutes when 30.5 m (100 ft.) of tow had been obtained a tow sample was taken and weighed. It would have 35 to 40 wt % resin.

Shear and flexure test specimens were prepared from the pregreg of LARC-TPI on 12K tow carbon fibers produced using the fluidized bed. Molding temperature was 15 minutes at 450° F. and one hour at 660° F. Molding pressure of 5.5 MPa (800 psi) was applied starting on the rise to 660° F. Six short beam shear samples were cut from a specimen with 33.5 wt % resin and a virtually transparent C-scan. They gave an average short beam shear strength of 85.0 MPa (12.3 ksi) with a standard deviation of 0.9 MPa (1.3 ksi). Four flexure test samples were cut from another specimen with 32.5 wt % resin. The average flexure strength was 2228 MPa (323 ksi) with a standard deviation of 97.2 MPa (14.1 ksi). The average flexure modulus was $13.4 \times 10^4$ MPa (19.4 Msi) and the average deflection was 0.19%.

Oven temperature and tow rate influence tow prepreg properties. The shear and flexure specimens were made from prepreg produced at an oven temperature of 280° C. (536° F.) at a tow rate of 4.2 cm/sec (1.7 in./sec). The oven length is 37.5 cm (15 in.) so that the tow residence time was 9.0 seconds. Essentially identical tow prepreg was made at 260° C. (500° F.) and a tow rate of 3.0 cm/sec (1.2 in./sec) and 12.7 second residence time. Tows prepared at higher temperatures and longer residence times are increasingly stiffer. The region from 280° C. (536° F.) and ten seconds to 260° C. (500° F.) and 15 seconds appears to define the lower limit of oven conditions at which to fuse LARC-TPI on 12K carbon fiber tows.

The resin material balance is an important consideration in design and scale up. Resin is placed in the chamber at start-up and is fed to the chamber during a run. Resin leaves the chamber on the tow and with the nitrogen flow to the vacuum system. Resin loss through the tow slots is reduced by the settling sections and is essentially eliminated by adjusting the vacuum drawn on the last section so that no resin is observed escaping the tow slots. The resin carried over in the nitrogen can be collected on a filter.

During two runs powder samples from the exit nitrogen stream were collected on a cartridge filter. These were steady state runs in which the resin level in the fluidized bed was constant and the resin fed to the chamber either left on the tow as prepreg or was carried over with the nitrogen. From the collected resin weight and collection time the resin carryover was determined for these runs. At a tow travel rate of 1.67 cm/sec (0.67 in./sec), 14.7% of the resin was carried over while at a tow travel rate of 2.94 cm/sec (1.18 in./sec), 19.7% carried over.

These material balance runs indicate that the fluidized bed system deposits between 80 and 85% of the resin on the tow. The remainder leaves with the carrier gas during steady state operation. A vacuum cleaner or baghouse can be used to collect the carried over resin for recycle. Periodically the bag is shaken to recover the powder layer and the bag reused. A layer of collected powder builds up on the inside of the bag and does the filtering with micron size particle collection efficiencies over 99% once the bag has been used several times.

At start-up the initial resin charge is fluidized and recirculated by the fan. Some of the resin, about 20 percent, is deposited on the walls and in the corners of the chamber. The remainder is fluidized and provides the resin cloud that contacts the tow as it passes through the chamber. Resin fed to the chamber during a run serves to maintain the cloud density.

The bubbling bed resin feeder provides reliability and simplicity of operation. For steady state operation a constant resin mass flow is required. To achieve this the carrier gas rate must be continually increased as the resin level in the bed decreases. Another concern is the need to remove the carrier gas from the fluidized bed and the attendant carryover of resin. A programmable controller can be used for the carrier gas rate and, as mentioned above, carried over resin can be collected for reuse.

2. Spreader Performance. Calibration data and single fiber force balance calculations for the pneumatic tow spreader are presented in Table 1. Comparison of the data for a 12K tow with the single fiber theoretical predications indicates that the bundle spread angle at the outer edge is much less. This is to be expected because the theory does not account for the effect of adjacent fibers and for air flow bypassing the tow fibers.

For prepreg runs the 12K tow was spread to the design limit of six degrees and the unit operated for extended periods without attention. Those instances where adjustment was required were usually related to tow irregularities or when tow samples were taken.

TABLE 1

| | TOW SPREAD ANGLES BRAKE AT 65 GRAMS OF TOW TENSION | |
|---|---|---|
| | Angle, Degrees | |
| Spreader Pressure Drop, psi | Single Fiber [Equations (1) and (5)] | 12K Tow Bundle Data |
| 0.10 | 4.0 | 1.0 |
| 0.15 | 5.6 | 1.5 |
| 0.20 | 6.5 | 3.0 |
| 0.225 | 6.9 | 4.0 |
| 0.250 | 7.2 | 5.0 |
| 0.275 | 7.4 | 6.0 |

3. Powder Deposition. Operating experience with the fluidized bed unit served to define the range of conditions for which acceptable prepreg could be made. This information may be correlated and used for system improvement and scale up.

Equation (12) relates system design and operating parameters, based upon fibrous filter theory, to the fluidized bed prepreg level. With $D_p = 7 \times 10^{-4}$ cm ($4.5 \times 10^{-4}$ in.), $U = 1.50$ cm/sec (0.6 in./sec), $\rho_p = 1.5$ g/cc, $\mu = 0.00187$ g/cm sec, and $D_f = 6 \times 10^{-4}$ cm ($2.4 \times 10^{-4}$ in.), the single fiber collection parameter is $\Psi = 0.054$. The single particle efficiency, $\eta_o$, is in the flat region of the correlation curve (8) at 0.0045. The Reynolds number $\eta_o$ for flow passed the fiber is 0.00129 and for a tow void fraction of 0.97 the collection efficiency of the average fiber, equation (9), is $\eta_i = 0.00465$.

The contact tow length in the fluidized bed chamber is L = 15 cm (6 in.) and the 12K tow weights 0.0084 g/cm so that the bracket in equation (12) for the system is 195 cm$^4$/g sec and the system transport relation is $$P = 195n/U_t \quad (13)$$

This is the theoretical relation between weight percent prepreg, resin cloud density and tow speed.

Resin cloud samples were not taken, but initial cloud densities for four runs serve to demonstrate the viability of equations (12) and (13). Table 2 presents data from a series of runs that began with different initial amounts of resin placed in the chamber. The cloud density was calculated assuming that 80 percent of the charge is fluidized by the circulation fan into the 5.6 liter chamber volume. This information was used to calculate the prepreg level predicted by equation (13). Comparison of the data with the predictions suggests that equations (12) and (13) can serve as a basis for design and operating data correlation.

TABLE 2

PREPREG DATA
TOW SPEED OF 4.2 CM/SEC

| Initial Resin Charge, Grams | Cloud Density, g/cc | Prepreg wt % Data | Equation (10) |
|---|---|---|---|
| 140 | 0.0200 | 46 | 49 |
| 100 | 0.0140 | 41 | 41 |
| 50 | 0.0071 | 28 | 26 |
| 75 | 0.0107 | 34 | 34 |

What is claimed is:

1. A process for the uniform application of polymer powder particles to a filamentary material in a continuous manner to form a uniform composite prepreg material, which process comprises the following combination of sequential procedural steps:

continuously feeding a tow of the filamentary material under controlled tension into a spreading unit, spreading the moving filamentary tow into an even band by a controlled cross-flow of air providing lateral force on the moving filamentary tow, coating the spread filamentary tow with polymer particles from a fluidized bed, which acts in cooperation with a bubbling bed resin feeder providing a constant, recirculating resin mass flow to the fluidized bed for steady-state operation, fusing the coated filamentary tow, and taking up the fused, coated filamentary tow on a package for subsequent utilization.

2. The process of claim 1 wherein the fluidized bed provides a cloud of polymer powder particles which contacts the moving, spread filamentary tow.

* * * * *